United States Patent
Lim et al.

(10) Patent No.: US 7,663,837 B2
(45) Date of Patent: Feb. 16, 2010

(54) ROTOR BLADE AND HARD DISK DRIVE HAVING THE SAME

(75) Inventors: Hong-taek Lim, Suwon-si (KR); Byoung-gyou Choi, Suwon-si (KR); Sung-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 11/586,535

(22) Filed: Oct. 26, 2006

(65) Prior Publication Data

US 2007/0097544 A1   May 3, 2007

(30) Foreign Application Priority Data

Oct. 29, 2005   (KR)   .................. 10-2005-0102657

(51) Int. Cl.
*G11B 33/14* (2006.01)
*G11B 25/04* (2006.01)
*G11B 5/60* (2006.01)

(52) U.S. Cl. .................. 360/99.12; 360/97.02; 360/234

(58) Field of Classification Search .............. 360/97.02, 360/256.1, 97.03, 99.12, 98.08, 250, 234, 360/99.05

See application file for complete search history.

(56) References Cited

U.S. PATENT DOCUMENTS 6,754,040 B2   6/2004   Kim
2003/0179492 A1 *   9/2003   Kang et al. .............. 360/97.02

FOREIGN PATENT DOCUMENTS

| JP | 2000082274 A * | 3/2000 |
| JP | 2002-334497 | 11/2002 |
| KR | 1997-17403 | 4/1997 |
| KR | 1997-50673 | 7/1997 |
| KR | 1998-28751 | 8/1998 |

OTHER PUBLICATIONS

Korean Office Action dated Nov. 18, 2006 issued in KR 2005-102657.

* cited by examiner

*Primary Examiner*—Craig A Renner
*Assistant Examiner*—Tamara Ashford
(74) *Attorney, Agent, or Firm*—Stanzione & Kim LLP (57) ABSTRACT

A rotor blade and an HDD (hard disk drive) having the same, wherein the rotor blade is mounted together with a disk-shaped data storing medium on a spindle motor of the HDD to rotate coaxially with the disk-shaped data storing medium. The rotor blade includes a plurality of blades to increase a floating force applied to a slider that records or reads data on or from the disk-shaped data storing medium by increasing a speed of an airflow in an inner region of the disk-shaped data storing medium.

10 Claims, 5 Drawing Sheets

ROTOR BLADE AND HARD DISK DRIVE HAVING THE SAME

CROSS-REFERENCE TO RELATED APPLICATIONS

This application claims the benefit of Korean Patent Application No. 10-2005-0102657, filed on Oct. 29, 2005, in the Korean Intellectual Property Office, the disclosure of which is incorporated herein in its entirety by reference.

BACKGROUND OF THE INVENTION

1. Field of the Invention

The present general inventive concept relates to an HDD (hard disk drive), and more particularly, to a unit to increase a floating force that lifts a slider in an inner disk region and an HDD having the same.

2. Description of the Related Art

A hard disk drive (HDD) is an apparatus that uses a slider having a magnetic head to record data or read data on or from a disk-shaped data storing medium. The HDD is generally used as an auxiliary memory in a computer, an MP3 player, a mobile phone, etc.

Figure 1:
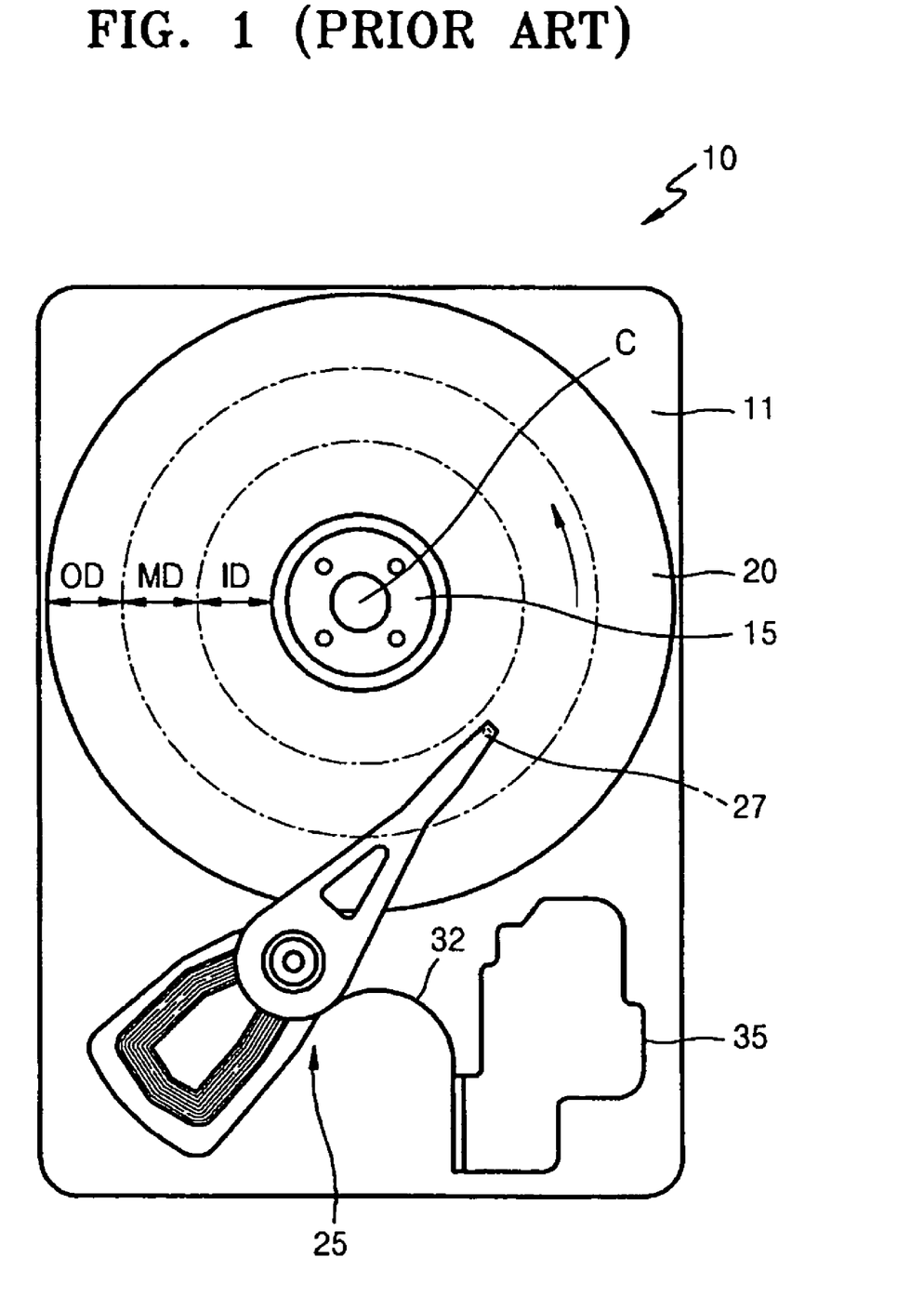
FIG. 1 is a schematic plane view illustrating an example of a conventional HDD.

FIG. 1 is a schematic plane view illustrating one example of a conventional HDD 10.

With reference to FIG. 1, the HDD 10 includes a disk 20, which is a data storing medium, a spindle motor 15 rotating the disk 20 at high speed, and an HSA (head stack assembly) 25, all of which are mounted in a housing having a base member 11, which is covered by a cover member (not shown). A slider 27 having a magnetic head (not shown) to record or read data is mounted on a front end of the HSA 25, and the HSA 25 records data on the disk 20 or reads the data recorded on the disk 20 by moving the slider 27 to a predetermined position of the disk 20. An FPC (flexible printed circuit) bracket 35 is arranged at a corner of one side of the base member 11 in order to connect an FPC 32, which is connected to the HSA 25, with a main circuit substrate (not shown) positioned under the base member 11.

When the disk 20 rotates counter-clockwise at high speed on the base member 11, airflow is generated in the same direction as the rotation direction of the disk 20, thereby lifting the slider 27. Thus, the slider 27 floats at a predetermined height above the disk 20, since a force generated by the airflow is equal to an elastic force of the front end of the HSA 25 that biases the magnetic head toward the disk 20. When the slider 27 is in a floating state, the magnetic head thereof records or reads data on or from the disk 20.

In general, a surface region of the disk 20 where data is recorded may be divided into three regions in a radial direction including an inner region ID, a middle region MD, and an outer region OD. When the disk 20 rotates, a ratio of linear velocities in the inner region ID and the outer region OD of the disk 20 reaches 2.5 to 3, because of the difference in the distances from a rotation center C. The difference between the linear velocities in the inner region ID and the outer region OD causes a difference between speeds of the airflow in the inner region ID and the airflow in the outer region OD, thereby reducing the floating force of the slider 27 when the slider 27 moves to the inner region ID. Consequently, as the floating state of the slider becomes unstable, the slider 27 and the disk 20 may collide with each other. For example, the slider 27 and the disk 20 can collide with each other even when a small external impact is applied to the HDD 10. As a result, a possibility of damaging the disc 20 and the magnetic head increases. The effects of this unstable floating state of the slider 27 are greater in a small-sized HDD with a diameter of 1 inch or less, where the rotation velocity of the disk 20 is relatively low.

SUMMARY OF THE INVENTION

The present general inventive concept provides a rotor blade that is mounted together with a disk-shaped data storing medium on a spindle motor of an HDD in order to increase a floating force of a slider in an inner region of the disk-shaped data storing medium, and an HDD having the rotor blade.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a rotor blade mounted together with a disk-shaped data storing medium on a spindle motor of an HDD to coaxially rotate with the disk-shaped data storing medium, the rotor blade including a plurality of blades to increase a floating force applied to a slider having a magnetic head to record or read data on or from the data storing medium by increasing a speed of airflow in an inner region of the disk-shaped data storing medium.

The rotor blade may include three blades that project radially and are spaced apart from each other at an interval of 120 degrees.

Each blade of the rotor blade may include an air-propelling surface to force air in the inner region.

The air-propelling surface of the blade may be tilted with respect to a surface of the disk-shaped data storing medium.

A thickness of the blade may be less than or equal to a height from a surface of the disk-shaped data storing medium to a head stack assembly (HSA) where the slider is mounted.

The foregoing and/or other aspects of the present general inventive concept are also achieved by providing a rotor blade usable with a hard disk drive having a disk, the rotor blade including a blade mounting hole disposed on a disk mounting hole of the disk to be rotatable coaxially therewith, and a plurality of blades extending from the blade mounting hole along a surface of the disk to push air when rotated with the disk.

The foregoing and/or other aspects of the present general inventive concept are also achieved by providing an HDD including a spindle motor, a disk-shaped data storing medium rotatably mounted on the spindle motor, a head stack assembly (HSA) having a front end where a slider is mounted, the slider having a magnetic head to record or read data on or from the disk-shaped data storing medium when floating above the disk-shaped data storing medium, and a rotor blade mounted on the spindle motor to coaxially rotate with the disk-shaped data storing medium and including a plurality of blades to increase a floating force applied to the slider by increasing a speed of airflow in an inner region of the disk-shaped data storing medium.

The air-propelling surface of the blade may be inclined with respect to a surface of the disk-shaped data storing medium.

The rotor blade may be mounted on the spindle motor to be in contact with the surface of the disk-shaped data storing medium.

The rotor blade may be mounted on an upper side or a lower side of the disk-shaped data storing medium.

The foregoing and/or other aspects of the present general inventive concept are also achieved by providing a hard disk drive, including a spindle motor, a disk rotatable by the spindle motor, and a rotor blade disposed on at least one side of the disk having a plurality of blades extending radially along a surface of the disk to push air when the disk is rotated.

The foregoing and/or other aspects of the present general inventive concept are also achieved by providing a spindle assembly usable with a hard disk drive, the spindle assembly including a spindle motor, a data disk disposed on the spindle motor to be rotated therewith, a clamp member to clamp the data disk to the spindle motor, and a rotor blade disk disposed between the clamp member and the data disk and having a plurality of predetermined surfaces arranged around a circumference thereof forming predetermined angles with respect to an axis of the rotor blade disk to increase a speed with which air is rotated around an inner circumference of the data disk.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
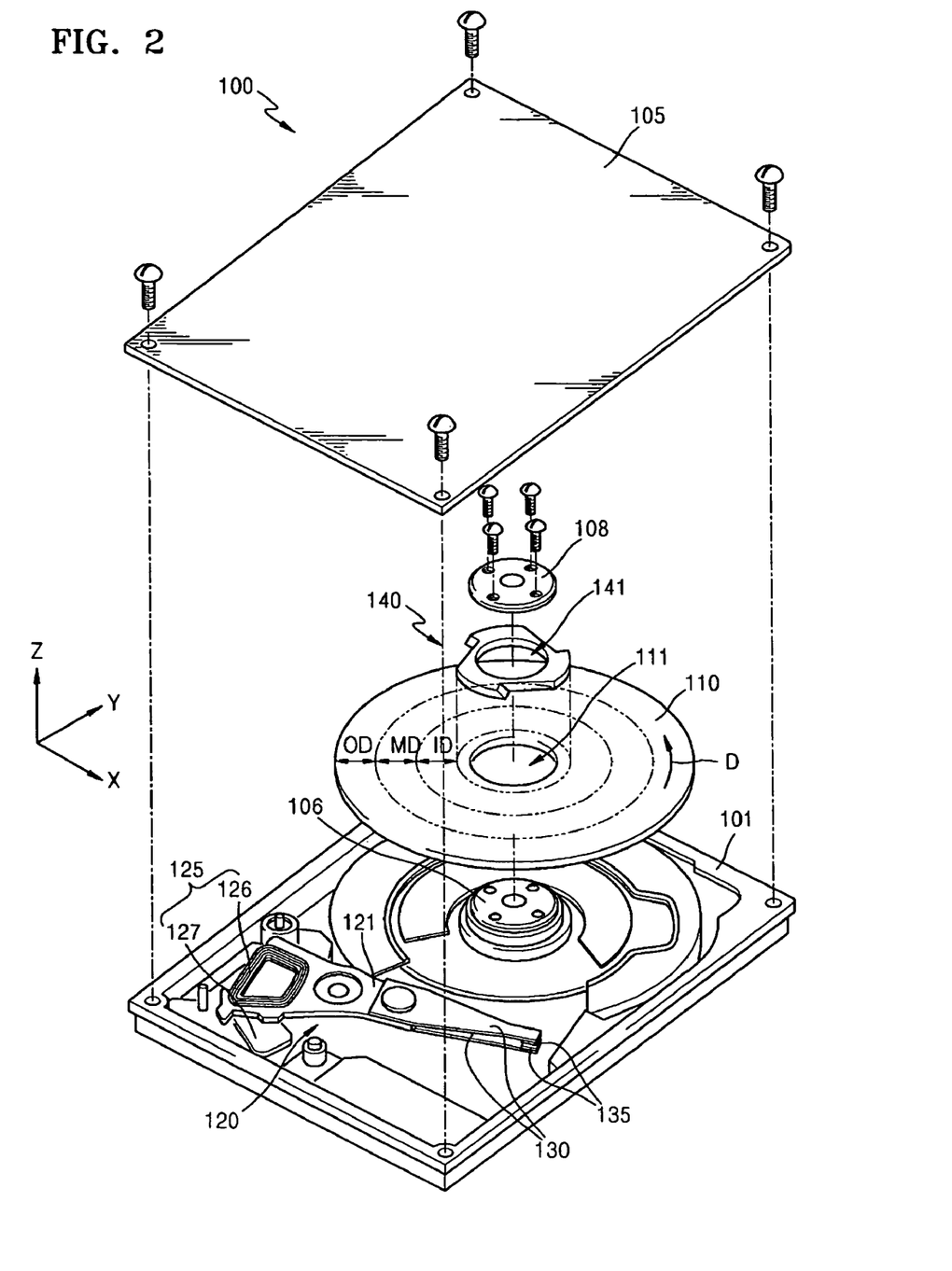
FIG. 2 is an exploded perspective view illustrating an HDD according to an embodiment of the present general inventive concept.

FIG. 2 is an exploded perspective view illustrating an HDD 100 according to an embodiment of the present general inventive concept. The HDD 100 may be a small-sized HDD, in which the diameter of a disk 110 is less than 1 inch (e.g., 0.85 inches).

With reference to FIG. 2, the HDD 100 includes a base member 101 and a cover member 105 to be connected with the base member 101. A spindle motor 106 rotates a data storing medium 110 (i.e., the disk) and an HSA 120 having a slider 135 on a front end thereof are mounted on the base member 101. For description purposes, the data storing medium 110 will be referred to as the disk 110.

The HSA 120 includes a swing arm 121 to be rotatably connected with the base member 101, a pair of suspensions 130 to be connected with an end of one side (i.e., a first side) of the swing arm 121, and a pair of sliders 135 to be mounted on front ends of the pair of suspensions 130, respectively, to face surfaces of upper and lower sides of the disk 110, respectively. The slider 135 includes a magnetic head (not shown) to record and/or read data on or from the disk 110. The suspension 130 supports the slider 135 to be elastically biased toward the respective surface of the disk 110. Although FIG. 2 illustrates the pairs of the suspensions 130 and the sliders 135, it should be understood that one suspension 130 with one slider 135 may alternatively be used with the present general inventive concept.

The HSA 120 has a VCM (voice coil motor) 125 to move the slider 135 to a specific position on the disk 110 by rotating the swing arm 121. The VCM 125 includes a VCM coil 126 arranged at an end of the other side (i.e., a second side) of the swing arm 121, and a magnet 127 disposed on the base member 101 and facing the VCM coil 126. The VCM 125 is controlled by a servo control system and rotates the swing arm 121 in a direction according to Fleming's left hand rule by the interaction of a current input to the VCM coil 126 and a magnetic field formed by the magnet 127.

The disk 110 is mounted on the spindle motor 106 via a disk mounting hole 111 and a disk clamp 108 is coupled with an upper end of the spindle motor 106, thereby pressing the disk 110 to fixedly mount the disk 110 on the spindle motor 106.

When the HDD 100 is powered on and the spindle motor 106 is driven, the disk 110 rotates counter-clockwise at high speed in the direction of arrow D. The rotation of the disk 110 causes an airflow flowing in the same direction D on a surface of the disk 110. Accordingly, a floating force acts on the slider 135 from the surface of the disk 110, and the slider 135 floats at a predetermined height when the floating force is equal to an elastic force of the suspension 130. When the current is input to the VCM coil 126 of the HSA 120, the swing arm 121 rotates in the direction according to the Fleming's left hand rule to move the slider 135 at a specific position on the disk 110, and the slider 135 records or reads data on or from the specific position while floating above the disk 110.

A surface region of the disk 110 where data is recorded can usually be divided into three regions including an inner region ID, a middle region MD, and an outer region OD, according to a distance from the spindle motor 106. The HDD 100 of the present embodiment includes a rotor blade 140 to prevent a speed of the airflow from decreasing in the inner region ID of the disk 110, as described with respect to the conventional HDD 10 of FIG. 1.

Figure 3:
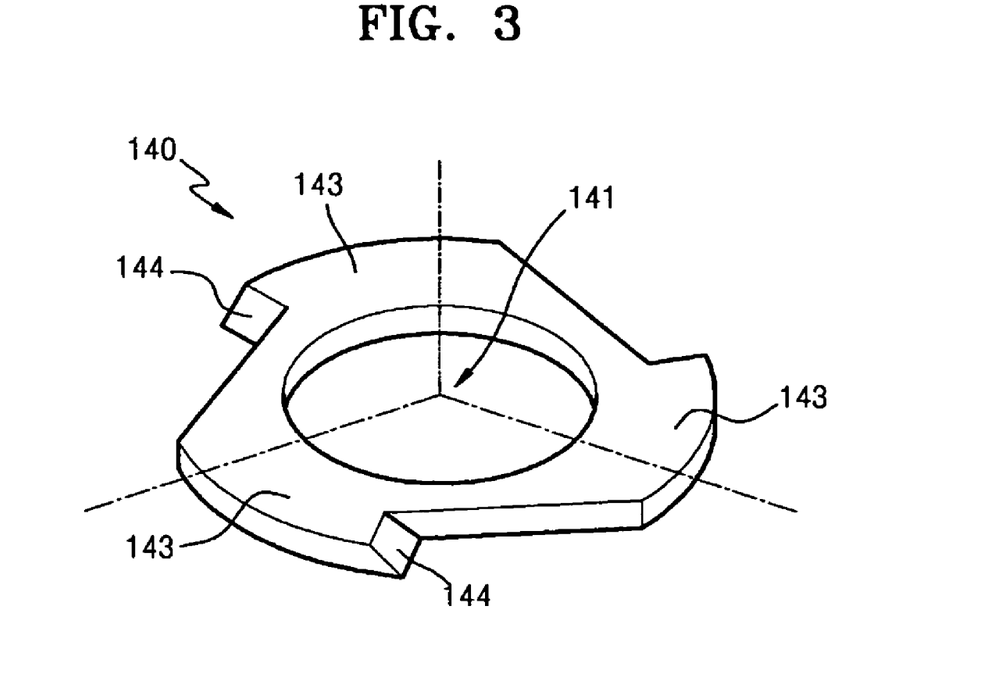
FIG. 3 is a perspective view illustrating a rotor blade according to an embodiment of the present general inventive concept.
Figure 4:
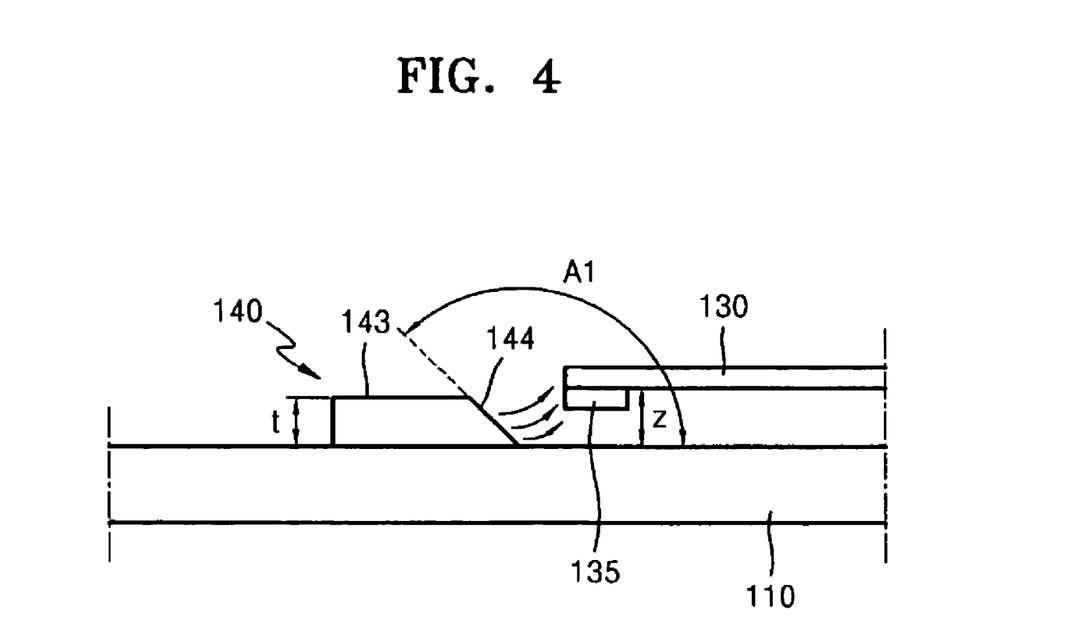
FIG. 4 is a view illustrating effects of the rotor blade of FIG. 3.

FIG. 3 is a perspective view illustrating the rotor blade 140 according to an embodiment of the present general inventive concept, and FIG. 4 is a view illustrating effects of the rotor blade 140 of FIG. 3.

With reference to FIGS. 2 through 4, the rotor blade 140 is fixedly mounted together with the disk 110 on the spindle motor 106 so as to contact the surface of the upper side of the disk 110, by using the disk clamp 108 coupled with the spindle motor 106. The rotor blade 140 includes a blade mounting hole 141 and blades 143 that project radially from the blade mounting hole 141 and are spaced apart from each other at an interval of 120 degrees (e.g., when there are three blades 143). Each blade 143 includes an air-propelling surface 144 to accelerate the airflow in the inner disk region ID of the disk 110. That is, when the disk 110 rotates, a linear velocity of the air-propelling surface 144 of the rotor blade 140, which rotates at the same angular velocity with the disk 110, is greater than a speed at which air would flow in the inner disk region ID in the absence of the rotor blade 140, and thus air in the inner disk region ID is forced in the rotation direction D of the disk 110. In other words, the rotation of the blades 143 pushes the air along faster than the air would move simply due to the rotation of the disk 110.

In order to reduce a thickness of the HDD 100, as illustrated in FIG. 4, a thickness "t" of the blade 143 with respect to the surface of the disk 110 may be designed to be equal to or less than a height "z" of the front end of the suspension 130 where the slider 135 is mounted with respect to the surface of the disk 110.

In order to prove the effects of the rotor blade 140, a CFD (computational fluid dynamics) analysis was conducted. In the CFD analysis, a small-sized HDD with a single disk was used, and a conventional HDD with no rotor blade (e.g., the HDD 10 of FIG. 1) was compared with the HDD 100 of the present embodiment having the rotor blade 140, as illustrated in FIG. 3. A diameter of the disk (20, 110) was 0.85 inches, a rotation velocity of the disk (20, 110) was 3600 rpm, and the tilt angle A1 of the air-propelling surface 144 of the rotor blade 140 with respect to the disk 110 surface was 135 degrees. Also, the airflow was assumed to be laminar flow. The results of the analysis are shown in Tables 1 and 2 below:

TABLE 1

|  | Conventional HDD (OD) | Conventional HDD (ID) | HDD of FIG. 2 (ID) |
| --- | --- | --- | --- |
| Speed (m/s) | 5.86 | 2.25 | 12.0 |

TABLE 2

|  | X Force (N) | Y Force (N) | X-Y Force (N) | Floating Force (N) |
| --- | --- | --- | --- | --- |
| Conventional HDD (OD) | 4.44E−07 | 4.77E−07 | 6.51E−07 | 2.22E−08 |
| Conventional HDD (ID) | 9.04E−08 | 1.25E−07 | 1.54E−07 | 6.03E−10 |
| HDD of FIG. 2 (ID) | 8.86E−08 | 1.23E−07 | 1.52E−07 | 7.90E−09 |

"ID" and "OD" in Tables 1 and 2 indicate a middle point of the inner disk region ID and a middle point of the outer disk region OD where the slider (27, 135) is positioned in the conventional HDD 10 and the HDD 100 of FIG. 2, and speed indicates the speed (in m/s) of the airflow caused by the rotation of the disk (20, 110).

An X force, a Y force, an X-Y force, and a floating force in Table 2 respectively indicate the forces (in Newtons) acting on the slider (27, 135) in the conventional HDD 10 and the HDD 100 of FIG. 2 in an x direction, a y direction, an x-y plane, and a z direction.

According to the results of Table 1, the speed of the airflow obtained at the middle point of the ID region in the HDD 100 with the rotor blade 140 of FIG. 3 is much greater than that of the airflow in the same region of the conventional HDD 10. Thus, it can be seen that the increase in the speed of the airflow increases the floating force of the slider 135 of the HDD 100 of FIG. 2.

The results of Table 2 indicate that the floating force at the middle point of the ID region of the HDD 100 with the rotor blade 140 of FIG. 3 increases by about nine times when compared to the floating force in the same region of the conventional HDD 10. In addition, the X-Y force does not change significantly. That is, the increase in the speed of the airflow due to the rotor blade 140 does not influence the X-Y force acting on the slider 135, and only increases the floating force acting on the slider 135. In other words, the rotor blade 140 increases the floating force on the slider 135 in a direction perpendicular to the disk 110, while not affecting the X-Y force on the slider 135 in a direction that is parallel to the disk 110. Accordingly, the HSA 120 can effectively move the slider 135, since the rotor blade 140 has no substantial effect on the X-Y force.

Figure 5:
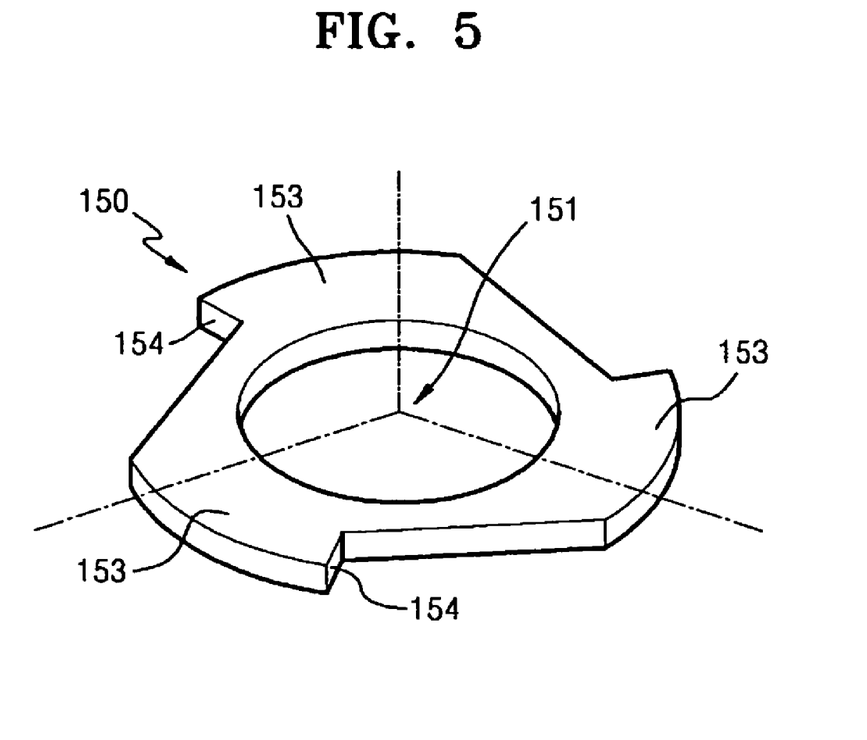
FIG. 5 is a perspective view illustrating a rotor blade according to another embodiment of the present general inventive concept.
Figure 6:
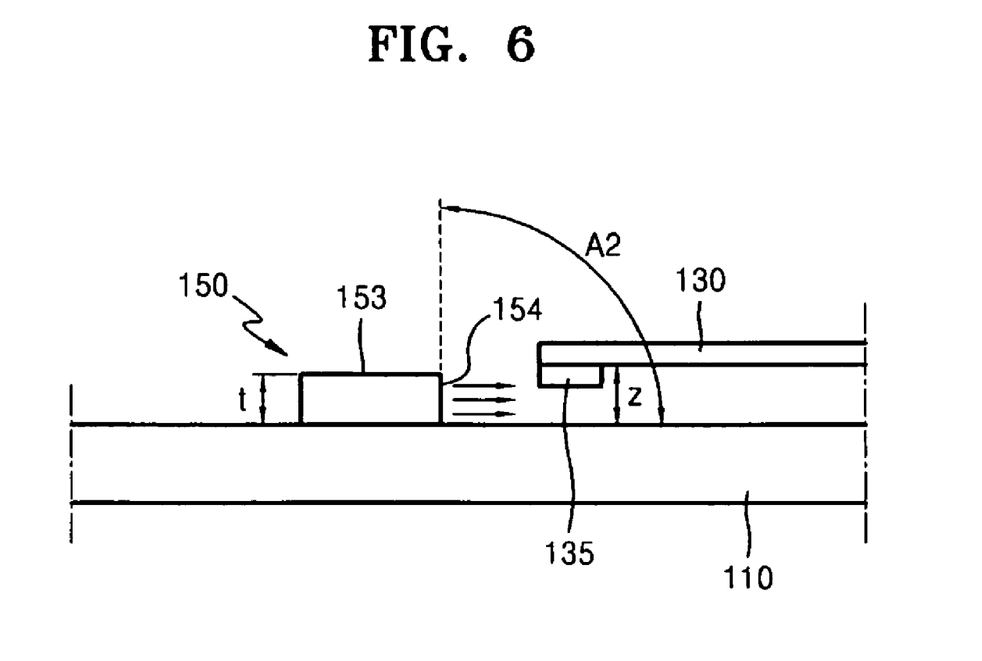
FIG. 6 is a view illustrating effects of the rotor blade of FIG. 5.

FIG. 5 is a perspective view illustrating a rotor blade 150 according to another embodiment of the present general inventive concept, and FIG. 6 is a view illustrating effects of the rotor blade 150 of FIG. 5.

Referring to FIGS. 5 and 6, the rotor blade 150 can be applied to the HDD 100 of FIG. 2, instead of the rotor blade 140. Similar to the rotor blade 140 of FIGS. 3 and 4, the rotor blade 150 includes a blade mounting hole 151 to mount the disk 110 on the spindle motor 106 (see FIG. 2) and blades 153 that project radially from the blade mounting hole 151 and are spaced apart from each other at an interval of 120 degrees (e.g., when the number of blades 153 is three). Each blade 153 includes an air-propelling surface 154 to force (or push) the airflow in the inner disk region ID (see FIG. 2) in the rotation direction D (see FIG. 2) of the disk 110.

The air-propelling surface 154 is perpendicular to the surface of the disk 110. That is, as illustrated in FIG. 6, a tilt angle A2 of the air-propelling surface 154 with respect to the surface of the disk 110 is 90 degrees. The air-propelling surface 154 having the tilt angle A2 causes the airflow to flow in a direction parallel to the surface of the disk 110 in the inner disk region ID, as indicated by the arrows illustrated in FIG. 6. The airflow flowing in the direction that is parallel to the surface of the disk 110 has the effect of increasing the floating force of the slider 135, when compared to an HDD that has no rotor blade at all (e.g., the conventional HDD 10 of FIG. 1). Additionally, the rotor blade 150 of FIGS. 5 and 6 may not provide as large of an increase in the floating force as the rotor blade 140 of FIGS. 3 and 4.

Figure 7:
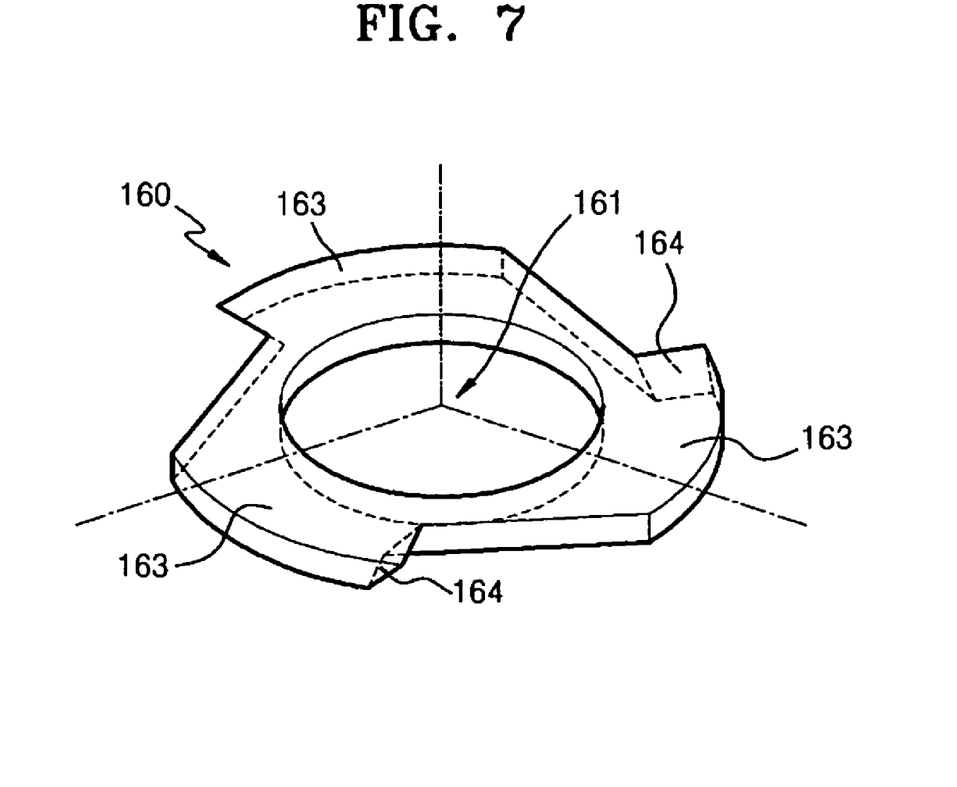
FIG. 7 is a perspective view illustrating a rotor blade according to yet another embodiment of the present general inventive concept.
Figure 8:
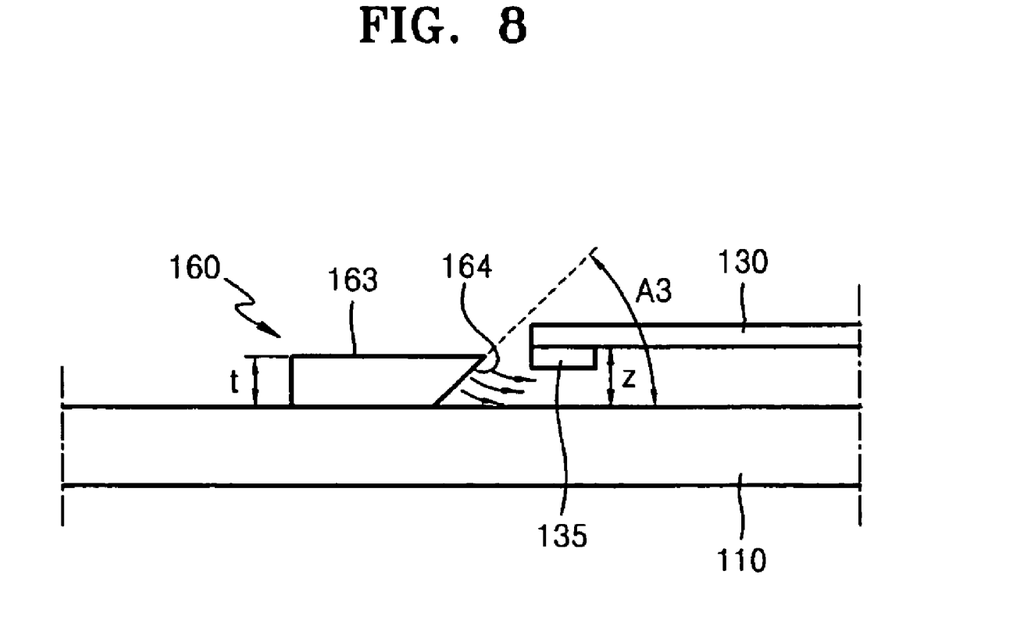
FIG. 8 is a view illustrating effects of the rotor blade of FIG. 7.

FIG. 7 is a perspective view illustrating a rotor blade 160 according to yet another embodiment of the present general inventive concept, and FIG. 8 is a view illustrating effects of the rotor blade 160 of FIG. 7.

Referring to FIGS. 7 and 8, the rotor blade 160 can be applied to the HDD 100 of FIG. 2, instead of the rotor blade 140 of FIGS. 3 and 4 or the rotor blade 150 of FIGS. 5 and 6. Similar to the rotor blade 140 or the rotor blade 150, the rotor blade 160 includes a blade mounting hole 161 to mount the disk 110 on the spindle motor 106 (see FIG. 2) and blades 163 that project radially from the blade mounting hole 161 and are spaced apart from each other at an interval of 120 degrees (e.g., when the number of blades 163 is three). Each blade 163 includes an air-propelling surface 164 to force the airflow in the inner disk region ID (see FIG. 2) in the rotation direction D (see FIG. 2) of the disk 110.

The air-propelling surface 164 is tilted so as to face the surface of the disk 110. That is, as illustrated in FIG. 8, a tilt angle A3 of the air-propelling surface 164 with respect to the surface of the disk 110 is an acute angle. The air-propelling surface 164 having the tilt angle A3 causes the airflow to flow in a direction toward the surface of the disk 110 in the inner disk region ID, as indicated by the arrows illustrated in FIG. 8. The airflow flowing in the direction toward the surface of the disk 110 has the effect of increasing the floating force acting on the slider 135 when compared to an HDD that has no rotor blade at all (e.g., the conventional HDD 10 of FIG. 1), since the speed of the air flow is increased by the rotor blade 160. Additionally, the rotor blade 160 may not provide as large of an increase in the floating force as the rotor blade 140 of FIGS. 3 and 4 or the rotor blade 150 of FIGS. 5 and 6. In order to prove the effects of the rotor blades 140, 150 and 160 according to the embodiments as described above, a CFD (computational fluid dynamics) analysis was conducted. In the CFD analysis, a small-sized HDD with a single disk was used, and a conventional HDD with no rotor blade (e.g., the conventional HDD 10 of FIG. 1) was compared with the HDD 100 with the rotor blades 140, 150 and 160 with respect the floating force acting on the slider (27, 135). The diameter of the disk was 0.85 inches, the rotation velocity of the disk was 3600 rpm, the tilt angle A1 of the air-propelling surface 144 of the rotor blade 140 in FIG. 3 with respect to the surface of the disk was 135 degrees (i.e., the air-propelling surface 144 faces away from the surface of the disk 110), the tilt angle A2 of the air-propelling surface 154 of the rotor blade 150 in FIG. 5 was 90 degrees, and the tilt angle A3 of the air-propelling surface 164 of the rotor blade 160 in FIG. 7 was 45 degrees (i.e., the air propelling surface 164 faces toward the surface of the disk 110). Also, the airflow was assumed to be laminar flow. The results of the analysis are shown in Table 3 below:

TABLE 3

|  | Conventional HDD (ID) | HDD of FIG. 3 (ID) | HDD of FIG. 5 (ID) | HDD of FIG. 7 (ID) |
| --- | --- | --- | --- | --- |
| Floating force (N) | 6.03E−10 | 7.90E−09 | 6.93E−09 | 3.07E−09 |

The results of Table 3 indicate that the floating force in the inner disk region ID of the HDD 100 with the rotor blade 140 of FIG. 3 is improved by about 12%, when compared to the floating force in the same region (i.e., the inner disk region ID) of the HDD 100 with the rotor blade 150 of FIG. 5, and by about 61% when compared to the floating force in the same region (i.e., the inner disk region ID) of the HDD 100 with the rotor blade 160 of FIG. 7. It was also proven that the floating force in the inner disk region ID in the HDD 100 with any of the rotor blades 140, 150, and 160 of each of FIGS. 3, 5 and 7, respectively, is improved when compared to the floating force in the same region (i.e., the inner disk region ID) of the conventional HDD with no rotor blade (e.g., the conventional HDD 10 of FIG. 1).

According to embodiments of the present general inventive concept, floating forces in the inner, middle, and outer disk regions ID, MD, and OD, may be made approximately equal. Alternatively, these floating forces may be made to have other predetermined ratios.

It should be understood that the rotor blades 140, 150, and 160 of the embodiments of FIGS. 3-4, 5-6, and 7-8, respectively, may be have a variety configurations that do not depart from the scope of the present general inventive concept. For example, the number of blades of the rotor blade (140, 150, and/or 160) may be two, three, four, or more. Further, the rotor blade (140, 150, and/or 160) may be mounted to be in contact with the surface of the lower side of the disk 110.

An HDD with a rotor blade of embodiments of the present general inventive concept increases a floating force applied to a slider in an inner disk region, thereby enabling stable floating of the slider, regardless of a position of the slider above the disk. Thus, it is possible to prevent a collision between a disk and the slider by an external impact and damage to the slider and the disk due to the collision.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A rotor blade mounted together with a disk-shaped data storing medium on a spindle motor of a hard disk drive to rotate coaxially with the disk-shaped data storing medium, the rotor blade comprising:
   a plurality of blades to increase a floating force applied to a slider that records or reads data on or from the disk-shaped data storing medium by increasing a speed of an airflow in an inner region of the disk-shaped data storing medium,
   wherein each of the blades includes an air-propelling surface to force air in the inner region, and
   the air-propelling surface is tilted with respect to a surface of the disk-shaped data storing medium such that the air-propelling surface faces away from the surface of the disk-shaped data storing medium.

2. The rotor blade of claim 1, wherein the plurality of blades includes three blades, and the blades project radially and are spaced apart from each other at an interval of 120 degrees.

3. The rotor blade of claim 1, wherein a thickness of the blade is less than or equal to a height of a head stack assembly where the slider is mounted with respect to the surface of the disk-shaped data storing medium.

4. A rotor blade usable with a hard disk drive having a disk, the rotor blade comprising:
   a blade mounting hole disposed on a disk mounting hole of the disk to be rotatable coaxially therewith; and
   a plurality of blades extending from the blade mounting hole along a surface of the disk to push air when rotated with the disk,
   wherein each of the blades includes an air-propelling surface, and
   the air-propelling surface is tilted with respect to a surface of the disk such that the air-propelling surface faces away from the surface of the disk.

5. A hard disk drive, comprising:
   a spindle motor;
   a disk-shaped data storing medium rotatably mounted on the spindle motor;
   a head stack assembly having a slider mounted at a front end thereof, the slider recording or reading data on or from the disk-shaped data storing medium while floating above the disk-shaped data storing medium; and
   a rotor blade mounted together with the disk-shaped data storing medium on the spindle motor to rotate coaxially with the disk-shaped data storing medium, the rotor blade including a plurality of blades to increase a floating force applied to the slider by increasing a speed of an airflow in an inner region of the disk-shaped data storing medium,
   wherein each of the blades includes an air-propelling surface to force air in the inner region, and
   the air-propelling surface is tilted with respect to a surface of the disk-shaped data storing medium such that the air-propelling surface faces away from the surface of the disk-shaped data storing medium.

6. The hard disk drive of claim 5, wherein the plurality of blades includes three blades, and the blades project and are spaced apart from each other at an interval of 120 degrees.

7. The hard disk drive of claim 5, wherein the rotor blade is mounted on the spindle motor to be in contact with the surface of the disk-shaped data storing medium.

8. The hard disk drive of claim 5, wherein a thickness of each of the blades of the rotor blade is less than or equal to a height of a head stack assembly where the slider is mounted with respect to a surface of the disk-shaped data storing medium.

9. The hard disk drive of claim 5, wherein the rotor blade is mounted on an upper side or a lower side of the disk-shaped data storing medium.

10. A hard disk drive, comprising:

a spindle motor;

a disk rotatable by the spindle motor; and a rotor blade disposed on at least one side of the disk having a plurality of blades extending radially along a surface of the disk to push air when the disk is rotated, wherein each of the blades has a leading surface to propel the air, the leading surface being inclined at an obtuse angle with respect to the surface of the disk.

\* \* \* \* \*